US009921994B1

(12) United States Patent
Zhu et al.

(10) Patent No.: US 9,921,994 B1
(45) Date of Patent: Mar. 20, 2018

(54) DYNAMIC CREDIT CONTROL IN MULTI-TRAFFIC CLASS COMMUNICATION SYSTEM

(71) Applicant: Marvell International Ltd., Hamilton (BM)

(72) Inventors: Jun Zhu, San Jose, CA (US); Sharanya Divakaruni, San Jose, CA (US); Sheng De Jang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 156 days.

(21) Appl. No.: 14/988,506

(22) Filed: Jan. 5, 2016

Related U.S. Application Data

(60) Provisional application No. 62/121,395, filed on Feb. 26, 2015.

(51) Int. Cl.
*G06F 13/40* (2006.01)
*G06F 13/42* (2006.01)

(52) U.S. Cl.
CPC ...... *G06F 13/4265* (2013.01); *G06F 13/4027* (2013.01)

(58) Field of Classification Search
CPC ......... G06F 13/40; G06F 13/42; H04L 12/56; H04L 12/80
See application file for complete search history.

(56) References Cited

U.S. PATENT DOCUMENTS

| | | | | | |
|---|---|---|---|---|---|
| 5,757,771 | A * | 5/1998 | Li | ............... | H04L 49/3081 370/235 |
| 6,212,162 | B1 * | 4/2001 | Horlin | ............... | H04L 12/5602 370/229 |
| 6,438,107 | B1 * | 8/2002 | Somiya | ............... | H04L 12/5602 370/233 |
| 7,142,552 | B2 * | 11/2006 | Jeffries | ............... | H04L 47/10 370/230.1 |
| 7,385,997 | B2 * | 6/2008 | Gorti | ............... | H04L 47/10 370/412 |
| 7,500,012 | B2 * | 3/2009 | Jeffries | ............... | H04L 47/10 370/230 |
| 8,144,582 | B2 * | 3/2012 | Brown | ............... | G06F 13/4022 370/230.1 |
| 8,305,896 | B2 * | 11/2012 | Wood | ............... | H04L 47/10 370/230 |
| 9,501,442 | B2 * | 11/2016 | Kramer | ............... | G06F 13/368 |
| 2007/0268931 | A1 * | 11/2007 | Shaikli | ............... | H04J 3/047 370/468 |
| 2011/0064086 | A1 * | 3/2011 | Xiong | ............... | H04L 49/351 370/401 |

(Continued)

*Primary Examiner* — Henry Tsai
*Assistant Examiner* — Christopher a Daley

(57) ABSTRACT

Apparatuses and techniques for dynamic credit control in the context of a multi-traffic class communication system are described. Dynamic credit control is provided through the use of central-controlled, traffic class receiver buffers for multiple traffic classes. The size of the traffic class receiver buffers can be modified on-the-fly, during operation of the system. This provides a high degree of flexibility, particularly in the context of heavy traffic class packet traffic which, in turn, greatly facilitates operation of today's advanced applications.

20 Claims, 10 Drawing Sheets

(56) References Cited

U.S. PATENT DOCUMENTS

2014/0052874 A1* 2/2014 Hu .......................... G06F 5/14
709/234
2014/0269298 A1* 9/2014 Lu .......................... H04L 47/12
370/235

* cited by examiner

DYNAMIC CREDIT CONTROL IN MULTI-TRAFFIC CLASS COMMUNICATION SYSTEM

RELATED APPLICATIONS

This application claims priority to U.S. Provisional Patent Application Ser. No. 62/121,395 filed Feb. 26, 2015, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

In today's point-to-point communication protocols, like Peripheral Component Interconnect Express (PCIe) and MIPI UniPro, multiple traffic classes or "TCs" may be supported. A traffic class enables data, such as data packets, to be streamed between a so-called "local" side and a "remote" side. PCIe, for example, is a serial expansion bus standard for connecting a computer to one or more peripheral devices. Peripheral devices can include graphics adapter cards, network interface cards (NICs), storage accelerator devices and other high-performance peripherals.

Each traffic class has its own credit flow control mechanism. The term "credit" refers to the buffer space that is available for each traffic class. To date, credit flow control mechanisms control individual traffic classes independently. This means, for example, for a system that supports two separate traffic classes TC0 and TC1, each individual traffic class is required to have its own separate receiver buffers for flow control. This results in duplicated logic which is not shareable amongst the different traffic classes. For example, some advanced systems on-chip (SOCs) support a wide range of applications that may require high throughput for high-profile scenarios, and low throughput but low power for low-profile cases. In some cases, the TC1 traffic may be higher than the TC0, which may require a larger TC1 buffer for better performance. Yet, because of the independent nature and management of the receiver buffers for each traffic class, TC1 is unable to utilize additional buffer space. This is sub-optimal and can lead to inefficiencies when, for example, all the storage space may not necessarily be needed or used.

SUMMARY

This summary is provided to introduce subject matter that is further described below in the Detailed Description and Drawings. Accordingly, this Summary should not be considered to describe essential features nor used to limit the scope of the claimed subject matter.

Apparatuses and techniques for dynamic credit control in the context of a multi-traffic class communication system are described. Dynamic credit control is provided through the use of central-controlled, traffic class receiver buffers for multiple traffic classes. The size of the traffic class receiver buffers can be modified on-the-fly, during operation of the system. This provides a high degree of flexibility, particularly in the context of heavy traffic class packet traffic which, in turn, greatly facilitates operation of today's advanced applications.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Figure 1:
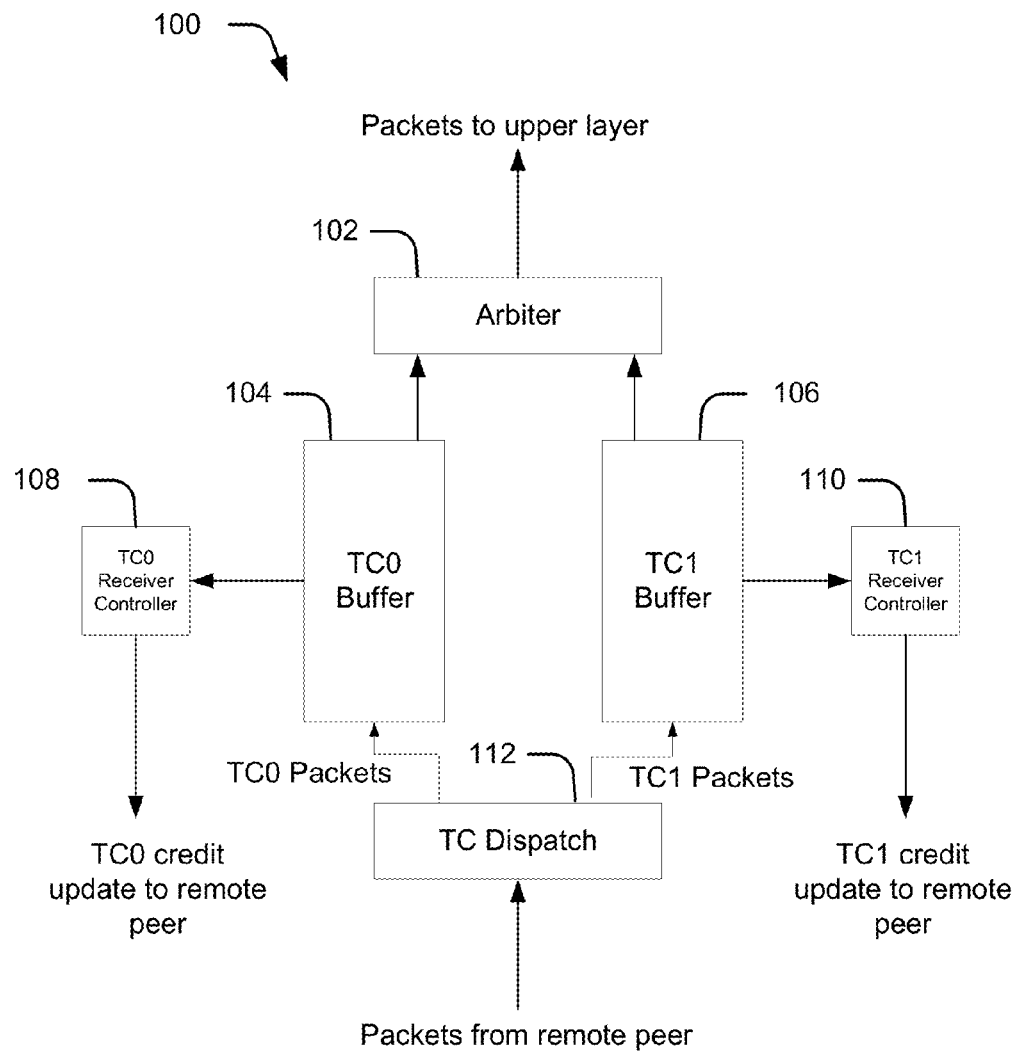
FIG. 1 illustrates a conventional traffic class system.

Conventional techniques approach credit control in point-to-point communication systems by utilizing separate and independent buffers for each traffic class (TC). The individual buffers are specifically dedicated to each traffic class and cannot be used for other traffic classes that may have performance requirements that could be more efficiently met through the use of additional buffer space. As an example, consider FIG. 1 which illustrates aspects of a traffic class system 100 in which this is the case. In this instance, system 100 constitutes a so-called "local" side in a point-to-point communication system. The local side transmits data packets to and receives data packets from a "remote" side or peer. System 100 includes an arbiter 102, a first traffic class buffer 104, a second traffic class buffer 106, a first receiver control component 108, a second receiver control component 110 and a traffic class dispatch component 112.

The traffic class dispatch component 112 receives data packets that are transmitted from the remote peer and stores the data packets in an associated designated traffic class buffer—either first traffic class buffer 104 (for TC0 packets) or second traffic class buffer 106 (for TC1 packets). The receiver control components 108, 110 provide credit updates to the remote peer so that the remote peer is knowledgeable of the buffer space available to hold data packets for each of the traffic classes. Packets that are stored in the traffic class buffers 104, 106 are processed by the arbiter 102 and passed to upper layers in the system for further processing, such as by an application.

In this particular example, each traffic class buffer 104, 106, is illustrated as a 4 KB SRAM that are used as receiver buffers for the first and second traffic classes, respectively. These traffic class buffers each have independent credit-based flow control that is implemented independently by each of the respective receiver control components 108, 110.

There is no mechanism for one traffic class to leverage another traffic class's receiver buffer, even if that receiver buffer is empty, unused, or otherwise underutilized. Additionally, this system is unable to change traffic class buffer sizes on-the-fly based on actual usage. As such, inefficiencies can arise when one buffer is near full and could use the benefit of extra storage, while the other buffer is empty or near empty.

This disclosure describes apparatuses and techniques for dynamic credit control in the context of a multi-traffic class communication system. Dynamic credit control is provided through the use of central-controlled, traffic class receiver buffers for multiple traffic classes. The receiver buffers can be implemented using single SRAM cells. The size of the traffic class receiver buffers can be modified on-the-fly, during operation of the system. This provides a high degree of flexibility which greatly facilitates operation of today's advanced applications.

The traffic class receiver buffers can be re-allocated based on usage such that traffic classes with heavier traffic can be allocated larger buffer sizes, while traffic classes with lighter traffic can be allocated smaller buffer sizes. In addition, some embodiments can support a low-throughput, low-power mode in which traffic class buffers that are not being utilized or are being underutilized can be placed into a low-power mode, with its associated traffic being reallocated to a different traffic class buffer. As such, system cost can be reduced by having a smaller gate count for multi-traffic class support. The benefits of dynamic credit control (e.g., gate count, power, and the like) scale based on the number of traffic classes that are supported by a particular system.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 2:
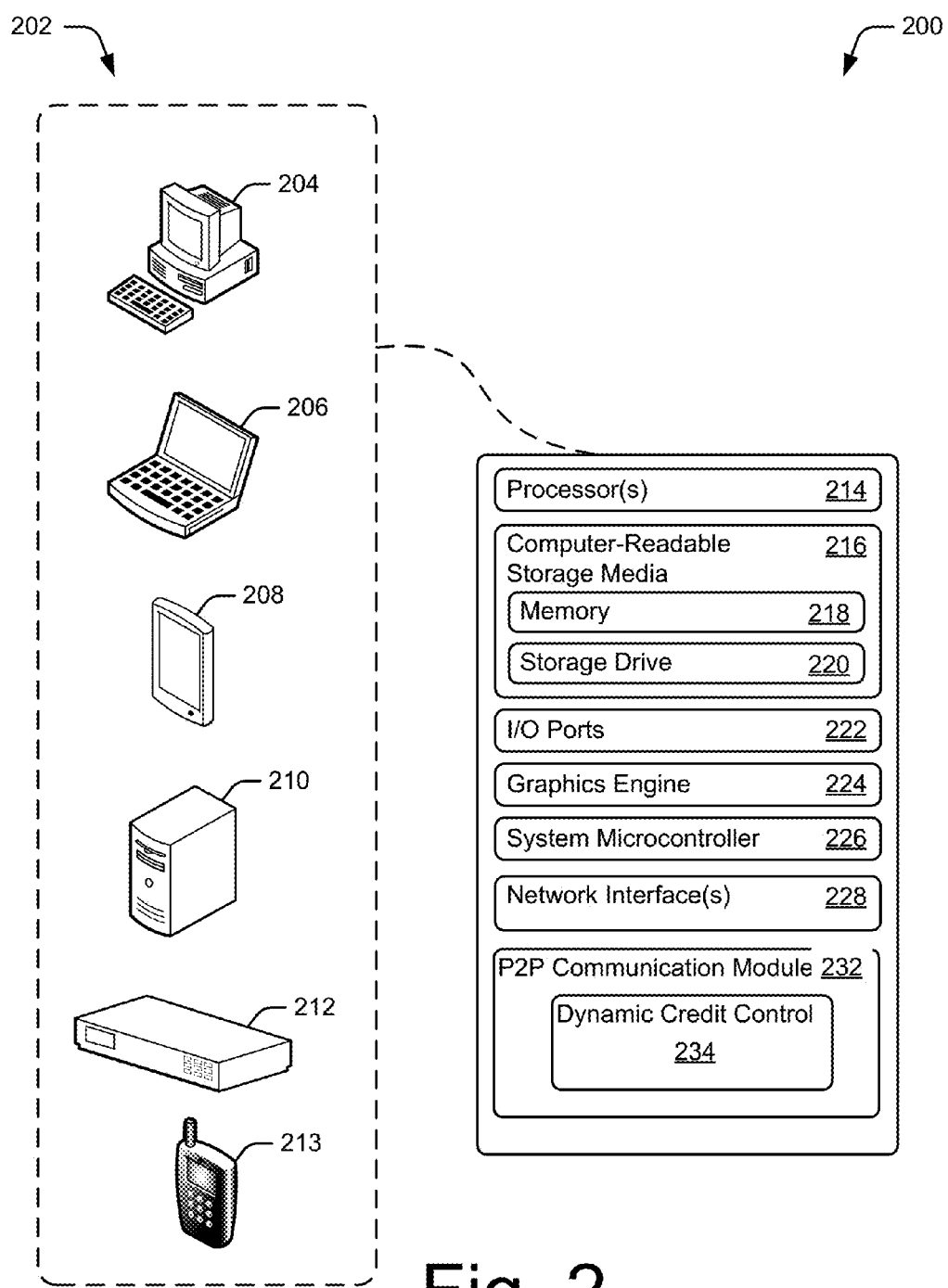
FIG. 2 illustrates an operating environment having a point-to-point communication module that includes a dynamic credit control component in accordance with one or more embodiments.

FIG. 2 illustrates an example operating environment 200 having devices 202, each of which are capable of communicating packets and/or frames in accordance with one or more point-to-point communication protocols. Example point-to-point communication protocols include, by way of example and not limitation, PCIe (Peripheral Component Interconnect Express) and MIPI UniPro (Mobile Industry Processor Interface Alliance Unified Protocol).

PCIe is a layered protocol, consisting of a transaction layer, a data link layer, and a physical layer. The data link layer is subdivided to include a media access control (MAC) sublayer. The physical layer is subdivided into logical and electrical sublayers, as will be appreciated by the skilled artisan. MIPI UniPro is a high-speed interface technology for interconnecting integrated circuits in mobile and mobile-influenced electronics. The layered protocol enables high-speed point-to-point communication between chips in mobile electronics. PCIe and MIPI UniPro constitute but two example point-to-point communication protocols that can employ the inventive techniques described herein. As such, other point-to-point communication protocols can be utilized without departing from the spirit and scope of the claimed subject matter including, by way of example and not limitation, Marvell's MoChi Interchip Link, and UFS Mobile Storage (utilizing MIPI UniPro as its Link Layer).

Devices 202 can include desktop computer 204, laptop computer 206, tablet computer 208, server 210, set-top box 212, and phone 213, a 2-in-1 device such as a Notebook/Tablet having a detached keyboard or human-machine interface, as well as a variety of other devices.

Each device 202 includes processor(s) 214 and computer-readable storage media 216. Computer-readable storage media 216 may include any type and/or combination of suitable storage media, such as memory 218 and storage drive(s) 220. Memory 218 may include memory such as dynamic random-access memory (DRAM), static random access memory (SRAM), read-only memory (ROM), or Flash memory (not shown) useful to store data of applications and/or an operating system of the device 202. Storage drive(s) 220 may include hard disk drives and/or solid-state drives (not shown) useful to store code or instructions associated with an operating system and/or applications of device 102. Processor(s) 214 can be any suitable type of processor, either single-core or multi-core, for executing instructions or commands of the operating system or applications stored on storage drive(s) 220.

Devices 202 can also each include I/O ports 222, graphics engine 224, system microcontroller 226, network interface(s) 228, and a point-to-point communication module 232 that employs a dynamic credit control component 232.

I/O ports 122 allow device 202 to interact with other devices and/or users. I/O ports 222 may include any combination of internal or external ports, such as audio inputs and outputs, USB ports, Serial ATA (SATA) ports, PCI-express based ports or card-slots, and/or other legacy ports. I/O ports 222 may also include or be associated with a packet-based interface, such as a USB host controller, digital audio processor, or SATA host controller. Various peripherals may be operatively coupled with I/O ports 222, such as human-input devices (HIDs), external computer-readable storage media, or other peripherals.

Graphics engine 224 processes and renders graphics for device 202, including user interface elements of an operating system, applications, command interface, or system administration interface. System microcontroller 226 manages low-level system functions of device 202. Low-level system functions may include power status and control, system clocking, basic input/output system (BIOS) functions, switch input (e.g. keyboard and button), sensor input, system status/health, and other various system "housekeeping" functions. Network interface(s) 222 provides connectivity to one or more networks Point-to-point communication module 232 is representative of functionality that enables point-to-point communication in compliance with a point-to-point communication protocol, such as those mentioned above as well as others. The point-to-point communication module 232 employs a dynamic credit control component 234 that provides central control over receiver buffers, such as SRAM cells, for all traffic class traffic. The dynamic credit control component 234 enables the size of traffic class receiver buffers to be changed during operation of the device while packets are being received from the remote peer. The traffic class receiver buffers can be re-allocated based on actual usage. This means that a traffic class with heavy traffic can be allocated a bigger buffer, while traffic classes with lighter traffic can be allocated a smaller buffer, as will become apparent below.

Having considered example computing devices in accordance with one or more embodiments, consider now a dynamic credit control component in accordance with one or more embodiments.

Dynamic Credit Control

Figure 3:
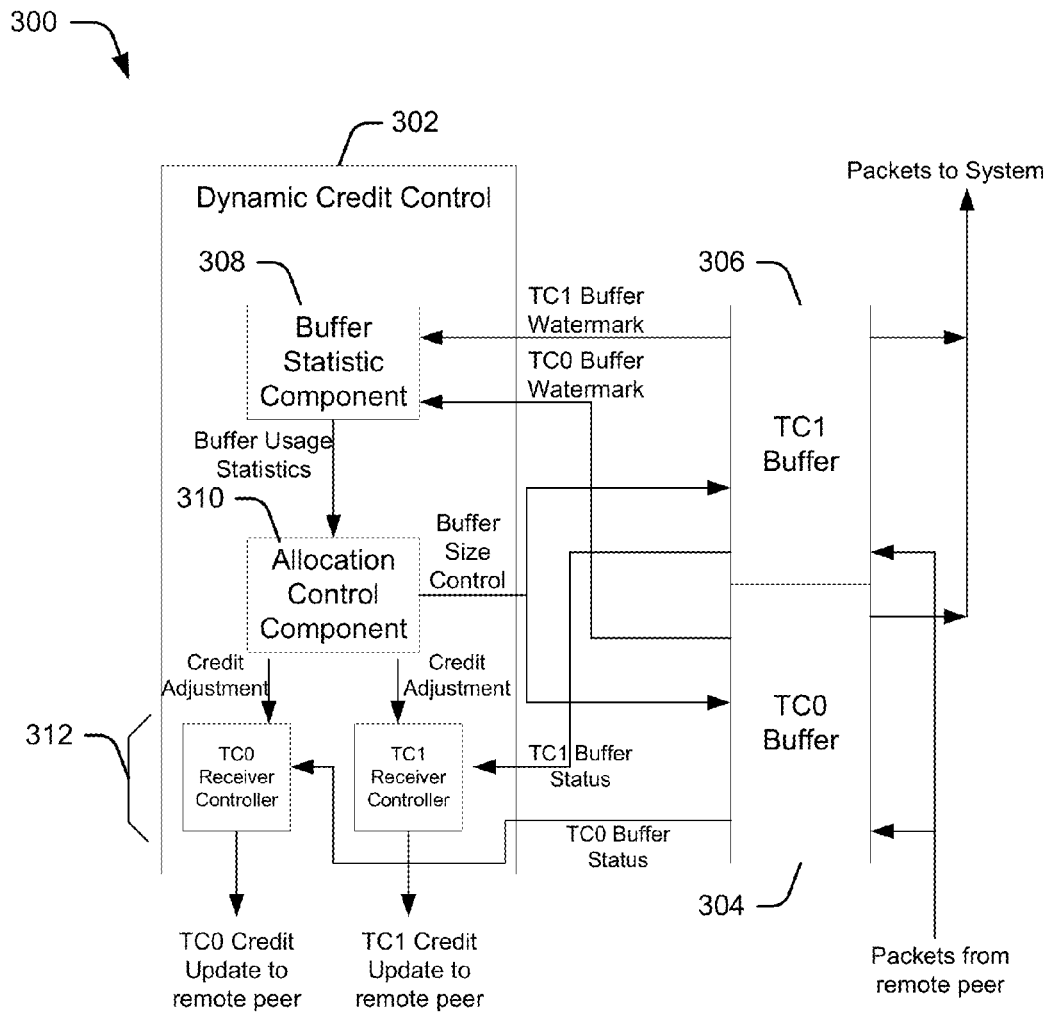
FIG. 3 illustrates a dynamic credit control system in accordance with one or more embodiments.

FIG. 3 illustrates a dynamic credit control system generally at 300 in accordance with one or more embodiments. In this particular example, the dynamic credit control system includes a dynamic credit control component 302 and traffic class buffers 304, 306. Traffic class buffer 304 is designated as "TC0 Buffer" and traffic class buffer 306 is designated as "TC1 Buffer." It is to be appreciated and understood that any suitable number of traffic class buffers can be utilized. In addition, in the illustrated example the traffic class buffers can be implemented as a single 8 KB SRAM or two 4 KB SRAMs. In the illustrated example, the traffic class buffers are arranged into a pool-type arrangement where all resources, such as packets, are written into the pool. This allows for dynamic reallocation of space within a buffer and improves upon past approaches in which the buffers were independent and not re-allocatable.

Dynamic credit control component 302 includes a buffer statistic component 308, an allocation control component 310, and a pair of receiver controllers designated generally at 312. A first of the receiver controllers is designated "TC0 Receiver Controller" and a second of the receiver controllers is designated "TC1 Receiver Controller."

The buffer statistic component 308 receives information from each buffer pertaining to how much data is stored in the corresponding buffer. Here, and in the discussion below, this information is represented as a buffer watermark. Accordingly, the buffer watermark for traffic class buffer 304 is designated "TC0 Buffer Watermark" and the buffer watermark for traffic class buffer 306 is designated "TC1 Buffer Watermark." The buffer statistic component 308 uses the watermarks to generate buffer usage statistics that it provides to allocation control component 310. Any suitable type of buffer usage statistics can be utilized. Buffer usage statistics represent data that can be used to allocate buffer size to take into account the actual operation of the device. For example, if traffic for one traffic classes high, its corresponding buffer can be reallocated to increase its size. For example, the buffer statistic component 308 can look at past historical buffer usage in an effort to predict future usage such that reallocation of buffer space can take place. In one example, described below in more detail, a sliding window approach can be used to ascertain how much traffic occurs for each traffic class within a particular window.

The allocation control component 310 receives the buffer usage statistics and uses the statistics to make a decision on how to reallocate a particular buffer. This is done by changing the size of a particular buffer through a buffer size control which is used to control the size of the buffers 304, 306. For example, because of current operating conditions TC1 Buffer 306 might be enlarged because of heavy traffic, and TC0 Buffer 304 might be reduced because of light traffic. In addition, when a buffer is reallocated by the allocation control component 310, a communication takes place from the local peer which performs the reallocation, to the remote peer. This communication contains a credit adjustment to update the remote peer. The credit adjustment is communicated by the allocation control component 310 to a respective one of the receiver controllers 312. The receiver controllers 312 communicate the credit update to the remote peer so that the remote peer becomes knowledgeable of the buffers available for each traffic class. This can be done in the form of a flow control frame that is sent to the remote peer. In addition to sending credit updates, each receiver controller receives buffer status information from each buffer that it uses to formulate the credit update. The buffer status information, which usually contains how much space is left and if the buffer is empty or full, is used by the receiver controller to calculate the credit available for the remote peer to throttle the data flow.

The remote peer can now make informed decisions on how to transmit its packets. For example, if an input packet from the remote peer is a TC1 packet, that packet is written into TC1 Buffer 306 using a write pointer TC1_BUF_WR_PTR. The packet can then be read out of TC1 Buffer 306 using the read pointer TC1_BUF_RD_PTR. A similar approach is used if an input packet is a TC0 packet. When the packets are read out of a particular buffer, the packets can be provided to an upper layer within the system for further processing, as will be appreciated by the skilled artisan.

Having considered components of an example dynamic credit control system, consider now aspects of one implementation in accordance with one or more embodiments.

Implementation Example

Figure 4:
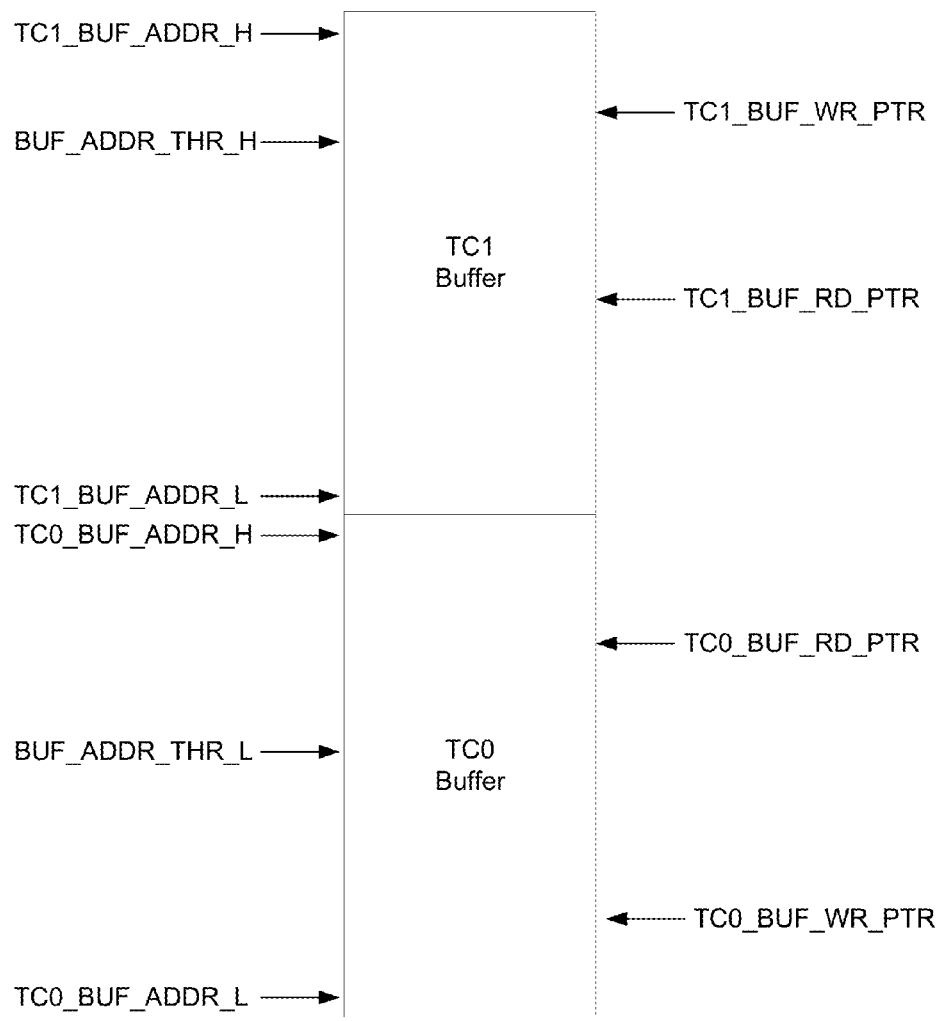
FIG. 4 illustrates two traffic class buffers in accordance with one or more embodiments.

FIG. 4 illustrates two traffic class buffers—TC0 Buffer and TC1 Buffer, along with various controls and buffer pointers. The controls appear on the left side of the illustration, and the buffer pointers appear on the right side of the illustration. In this particular example, the two traffic class buffers are managed in continuous address space regardless of whether they are implemented as a single 8 KB SRAM or two 4 KB SRAMs. With respect to the controls, consider the following definitions:

TC1_BUF_ADDR_H: upper bound of TC1_BUF address
TC1_BUF_ADDR_L: lower bound of TC1_BUF address
TC0_BUF_ADDR_H: upper bound of TC0_BUF address
TC0_BUF_ADDR_L: lower bound of TC0_BUF address
BUF_ADDR_THR_H: the address high threshold of buffers, TC1_BUF_ADDR_L and TC0_BUF_ADDR_H should be no larger than BUF_ADDR_THR_H.
BUF_ADDR_THR_L: the address low threshold of buffers, TC1_BUF_ADDR_L and TC0_BUF_ADDR_H should be no smaller than BUF_ADDR_THR_L.

With respect to the buffer pointers, consider the following definitions:

TC1_BUF_WR_PTR: TC1_BUF write pointer
TC1_BUF_RD_PTR: TC1_BUF read pointer
TC0_BUF_WR_PTR: TC0_BUF write pointer
TC0_BUF_RD_PTR: TC0_BUF read pointer In operation and in this particular example, the traffic class buffers are managed in a circular buffer fashion. For example, in order to perform a write operation to the TC1 Buffer, the following pseudocode describes how the write operation is performed using the nomenclature provided just above:

If write to TC1_BUF
Write data in the location pointed to by TC1_BUF_WR_PTR
If (TC1_BUF_WR_PTR==TC1_BUF_ADDR_H)
Then TC1_BUF_WR_PTR=TC1_BUF_ADDR_L
Else TC1_BUF_WR_PTR=TC1_BUF_WR_PTR+1

Similarly, in order to perform a read operation from the TC1 Buffer, the following pseudocode describes how the read operation is performed using the nomenclature provided just above:

If read from TC1_BUF
Read out data from the location pointed to by TC1_BUF_RD_PTR
If (TC1_BUF_RD_PTR==TC1_BUF_ADDR_H)
Then TC1_BUF_RD_PTR=TC1_BUF_ADDR_L
Else TC1_BUF_RD_PTR=TC1_BUF_RD_PTR+1

Read and write operations are performed similarly for the TC0 Buffer.

Recall from the discussion above that the buffer statistic component 308 (FIG. 3) uses traffic class buffer watermarks to look at past historical buffer usage in an effort to predict future usage such that reallocation of buffer space can take place. In one example, a sliding window approach can be used to ascertain how much traffic occurs for each traffic class within a particular window. In addition, in at least some embodiments, a step control, represented as a fixed size CHG_SIZE, is used to adjust the buffer size. Each adjustment is either an increase or decrease by a magnitude CHG_SIZE. Other approaches can be used without departing from the spirit and scope of the claimed subject matter. For example, buffer sizes can be adjusted in ways other than through a fixed size step control, such as through a variable sized step control which is dynamically adjusted based on operational parameters.

With respect to the sliding window approach, consider the following. In some embodiments, the buffer statistic component measures the usage of the traffic class buffers using the watermark of each traffic class buffer. Based on a programmable time window size, the buffer statistic component collects a maximum watermark and a minimum watermark. The buffer statistic component can keep track of multiple sliding time windows. For example, the buffer statistic component can acquire information for the past three windows as follows:

Window #1: {max_wm_TC1_buf, min_wm_TC1_buf), {max_wm_TC0_buf, min_wm_TC0_buf)
Window #2: {max_wm_TC1_buf, min_wm_TC1_buf), {max_wm_TC0_buf, min_wm_TC0_buf)
Window #3: {max_wm_TC1_buf, min_wm_TC1_buf), {max_wm_TC0_buf, min_TC0_buf)

Based on the collected information, the buffer statistic component can algorithmically determine whether to increase or decrease the size of a particular traffic class buffer. For example, a threshold can be used to determine whether traffic for a particular traffic class is heavy or light, or trending in a particular direction. For example, when max_wm is greater than a threshold, or trending in an increasing direction, a heavy flag can be set, otherwise if max_wm is smaller than a threshold, or trending in a decreasing direction, a light flag can be set. Based upon whether a particular buffer is determined to have heavy or light traffic, its size can be respectively increased or decreased dynamically. As an example, consider the following table:

| Case | TC0 | TC1 | Decision and Action |
|---|---|---|---|
| 1 | Heavy | Heavy | If TC1 buffer size is smaller than an initial value, increase TC1 buffer size, decrease TC0 buffer size, else no change |
| 2 | Heavy | Light | If TC1 buffer size reaches the minimumvalue, no change, else increaseTC0 buffer size and decreaseTC1 buffer size |
| 3 | Light | Heavy | If TC0 buffer size reaches the minimum value, no change, else increase TC1 buffer size and decrease TC0 buffer size |
| 4 | Light | Light | No change |

This table provides but one example of how decisions can be made to increase or decrease buffer sizes. Take, for example, case 2. In this example, the TC0 traffic is determined to be heavy, while the TC1 traffic is determined to be light. In this case, TC0 is given more credits and, hence, a reallocated bigger buffer. So the credits and the buffer will be re-allocated between TC0 and TC1. That is, some credits will be moved from TC1 to TC0, the TC1 buffer size will be decreased, and the TC0 buffer will be increased accordingly.

Figure 5:
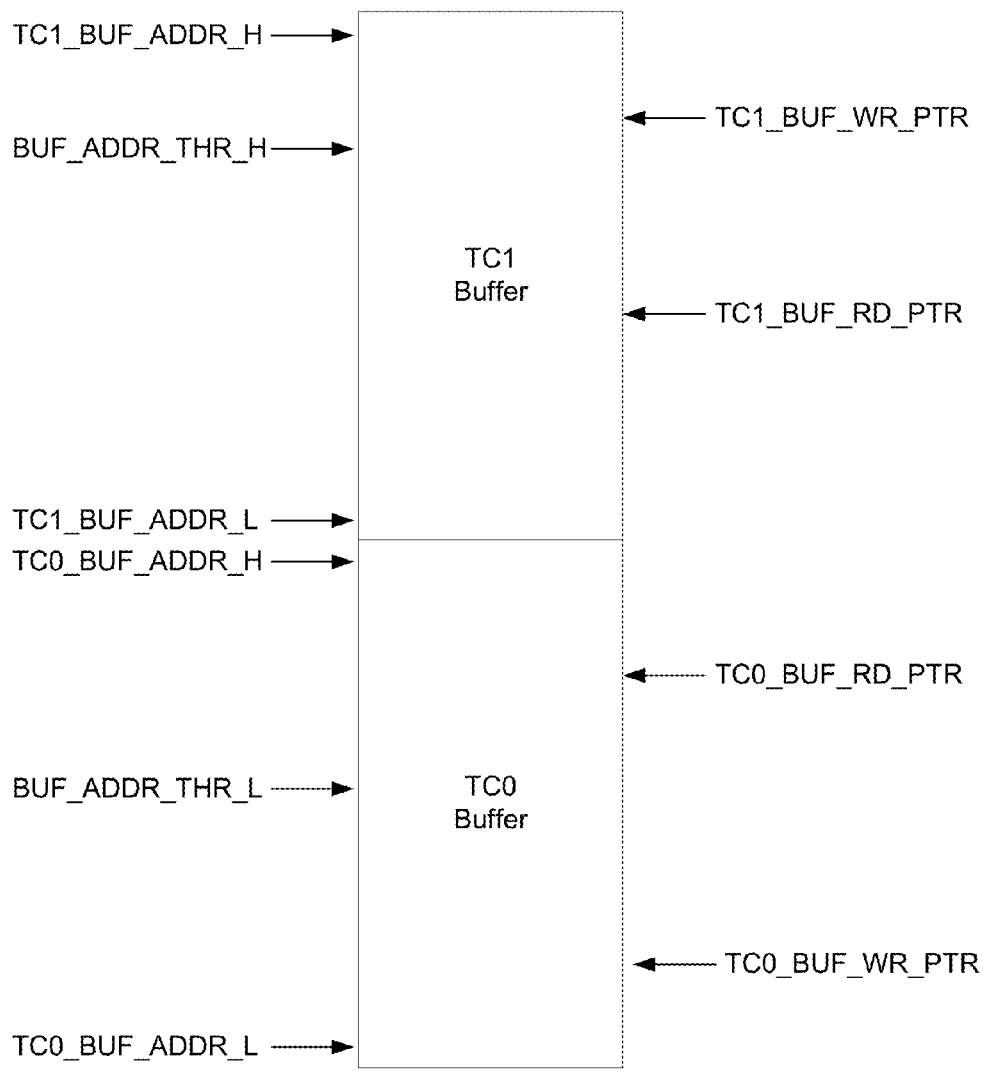
FIG. 5 illustrates two traffic class buffers in accordance with one or more embodiments.

With respect to changing the buffer size, consider the following in the context of FIG. 5, which uses the definitions provided above. Assume in this example that the buffer size of the TC0 Buffer is to be increased by a magnitude CHG_SIZE. The pseudocode to accomplish this, using the definitions in FIG. 5, is as follows:

If (accumulated credit increase for TC1 reaches CHG_SIZE)
{/*STEP 1*/
  if (TC1_BUF_WR_PTR>=TC1_BUF_RD_PTR) & (TC1_BUF_RD_PTR>=TC1_BUF_ADDR_L+CHG_SIZE) {
    TC1_BUF_ADDR_L=TC1_BUF_ADDR_L+CHG_SIZE;
    decrease TC1 credit to be sent to remote node by CHG_SIZE;
    if (TC0_BUF_RD_PTR<=TC0_BUF_WR_PTR)
    {/*STEP 2*/
    TC0_BUF_ADDR_H=TC0_BUF_ADDR_H+CHG_SIZE;
    increase TC0 credit to be sent by CHG_SIZE;
  }
}
}

Figure 6:
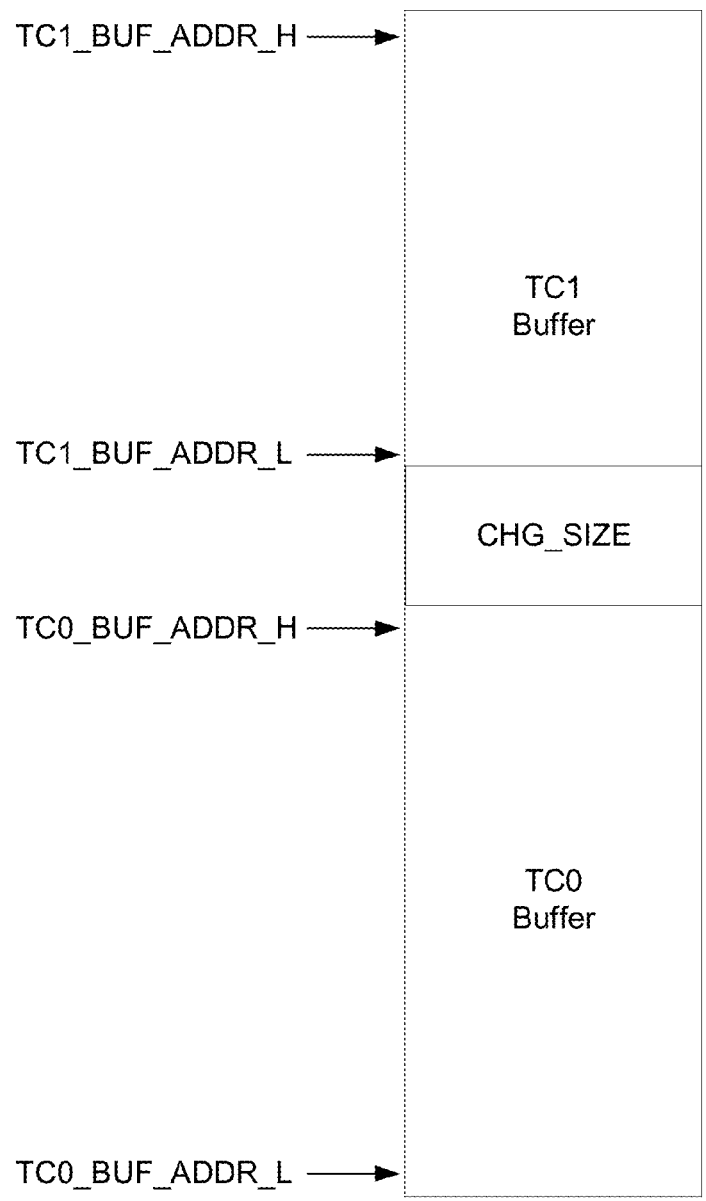
FIG. 6 illustrates two traffic class buffers in accordance with one or more embodiments.

In this example, increasing the buffer size of TC0 is a two-step process. First, the TC1 buffer size is decreased by CHG_SIZE in a manner described by the first portion of the pseudocode above. This results in a decrease in credit for the TC1 Buffer which is sent to the remote peer. This is diagrammatically represented by the buffers as illustrated in FIG. 6. Notice that the lower bound of the TC1 buffer address (TC1_BUF_ADDR_L) has been shifted to the top of the CHG_SIZE illustration, effectively shrinking the TC1 buffer size.

Figure 7:
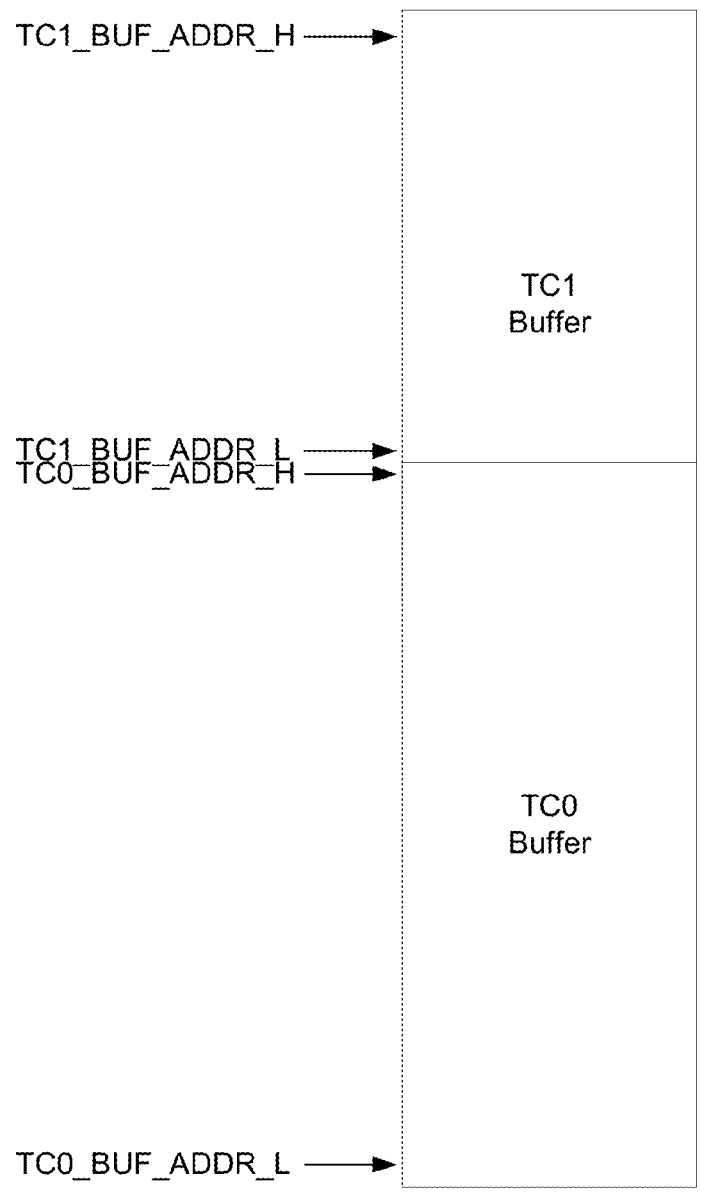
FIG. 7 illustrates two traffic class buffers in accordance with one or more embodiments.

Second, an increase in credit to the TC0 buffer is sent to the remote peer. This increases the size of the TC0 buffer by the magnitude CHG_SIZE. This is diagrammatically represented in FIG. 7. Notice here that the upper bound of the TC0 buffer address has been shifted upward by the CHG_SIZE amount, effectively increasing the buffer size.

A similar two-step operation can be performed to increase the size of the TC1 Buffer. That is, first the size of the TC0 buffer would be reduced, and then the size of the TC1 buffer would be increased by the magnitude CHG_SIZE.

Figure 8:
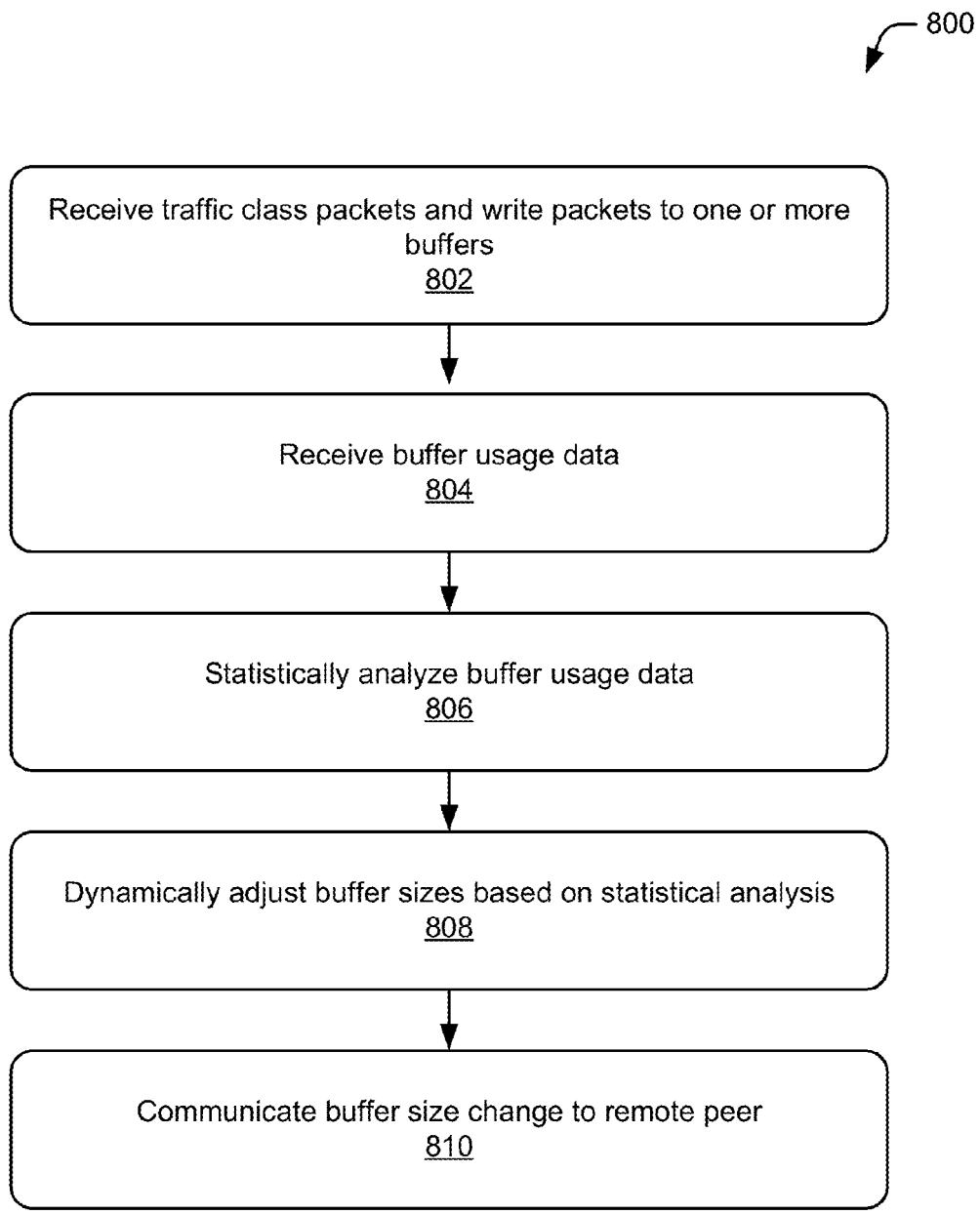
FIG. 8 is a flow diagram that describes steps in a method in accordance with one or more embodiments.

FIG. 8 depicts a method 800 for dynamically allocating buffer sizes during an operation in which traffic class packets are received and written into the buffer, in accordance with one or more embodiments.

At 802, traffic class packets are received and written to one or more traffic class (TC) buffers. The packets are received from a remote peer that is communicating using a point-to-point communication protocol. Examples of the point-to-point communication protocols are provided above. At 804, buffer usage data is received. Any suitable type of buffer usage data can be received, examples of which are provided above. At 806, the buffer usage data is statistically analyzed. In at least some embodiments, the buffer usage data utilizes watermarks for each traffic class buffer and the watermarks are analyzed using multiple sliding time windows. At 808, buffer sizes are dynamically adjusted based on the statistical analysis. For example, for traffic class buffers associated with heavy packet traffic, the buffer size can be increased, while traffic class buffers associated with lighter traffic can be decreased. This can be dynamically performed while packets are being received during operation of the system. At 810, buffer size changes are communicated to the remote peer. This enables the remote peer to make an informed decision on how and where to transmit its traffic class packets.

Having considered how buffer sizes can be dynamically allocated and resized during operation, consider now aspects of aspects of a low power mode.

Low Power Mode

In some embodiments, a traffic class buffer can be placed into a low power mode if operational conditions indicate that the buffer may not be needed, or that other buffers can be used to handle another buffer's traffic. For example, in embodiments where receiver buffers are implemented as separate SRAMs, different traffic classes can share one SRAM. This can be accomplished by moving all pointers to a single one of the SRAMs.

Figure 9:
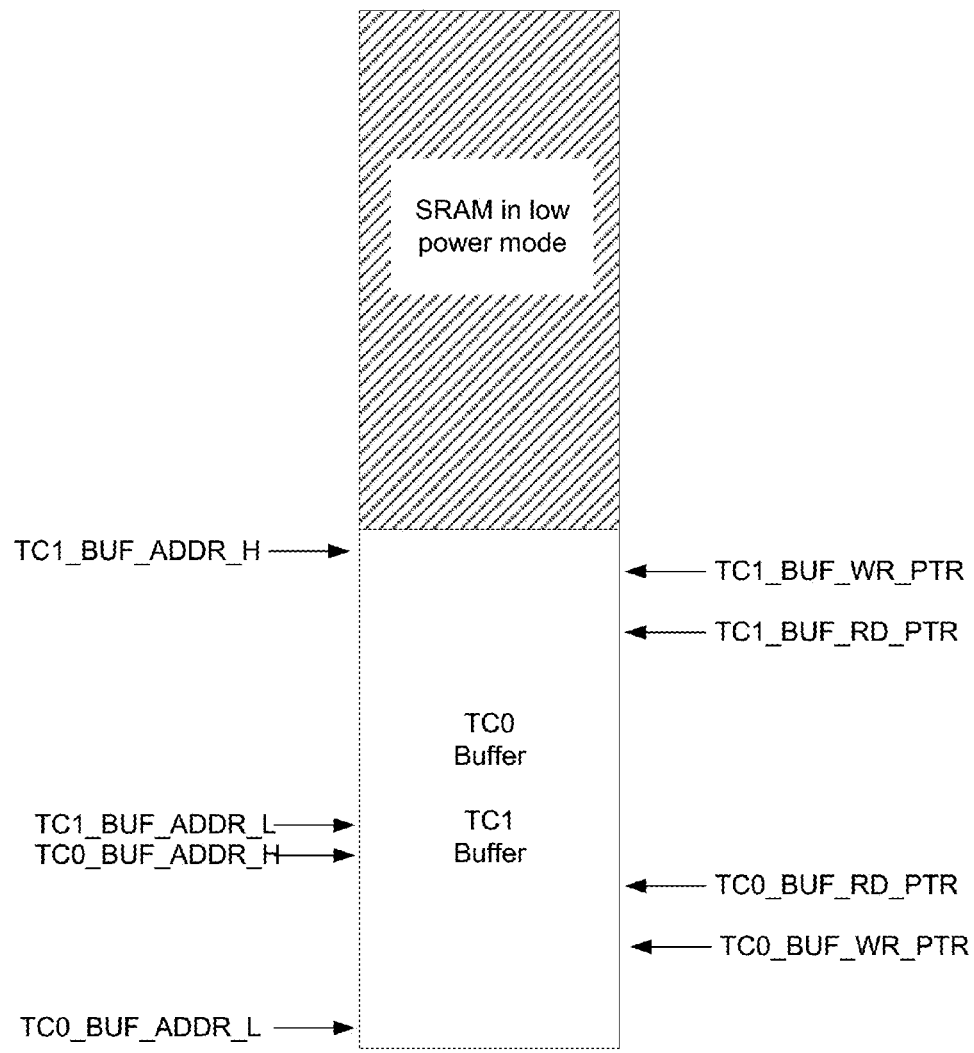
FIG. 9 illustrates two traffic class buffers in accordance with one or more embodiments.

As an example, consider FIG. 9 which illustrates two traffic class buffers. Notice that the top most buffer has been placed into a low-power mode and all of the pointers have been moved to the lower most buffer. So, for example, if each SRAM is a 4 KB SRAM, the TC0 Buffer may utilize 3 KB while the TC1 Buffer may utilize 1 KB of the TC0 buffer. Additionally, within this scheme, the techniques described above can be utilized. That is, once a particular SRAM has been placed in a low-power mode, buffer space within the buffer shared by the two traffic class buffers can be dynamically allocated as described above.

Having considered the above embodiments, consider now a system-on-a-chip that can be utilized in accordance with one or more embodiments.

System-On-Chip

Figure 10:
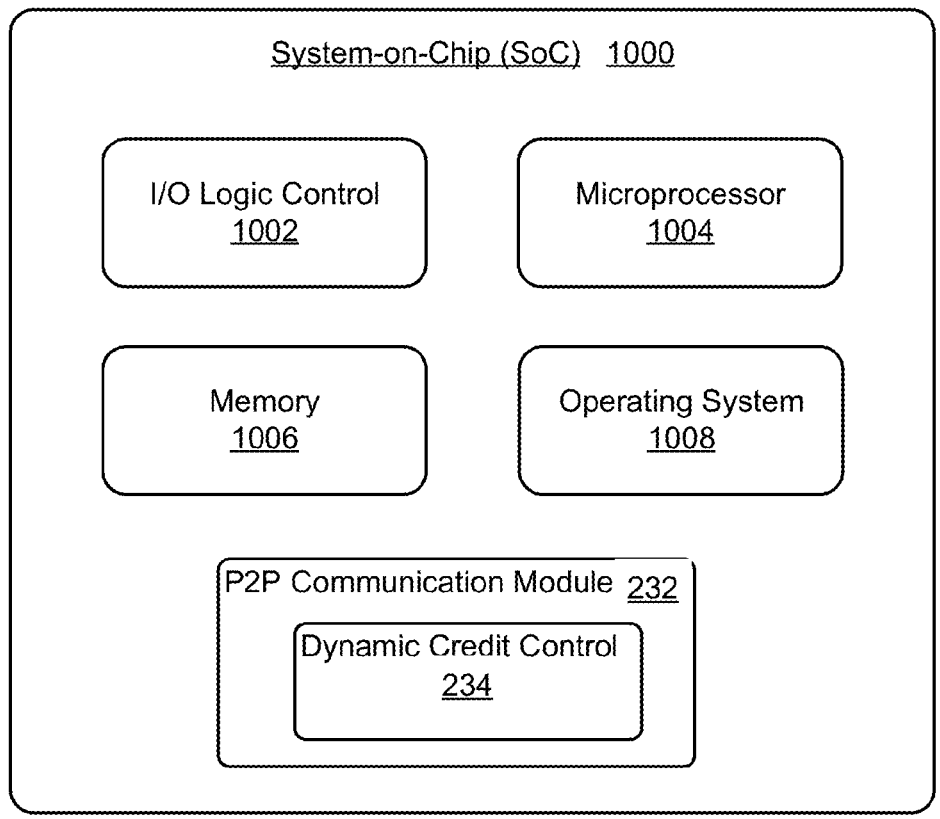
FIG. 10 illustrates a System-on-Chip (SoC) environment for implementing aspects of the techniques described herein.

FIG. 10 illustrates a System-on-Chip (SoC) 1000, which can implement various embodiments described above. A SoC can be implemented in any suitable device, such as a video game console, IP enabled television, desktop computer, laptop computer, tablet computer, server, network-enabled printer, set-top box, phone, mobile device and/or any other type of device.

SoC 1000 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 1000 can also include an integrated data bus (not shown) that couples the various components of the SoC for data communication between the components. A wireless communication device that includes SoC 1000 can also be implemented with many combinations of differing components. In some cases, these differing components may be configured to implement concepts described herein over a wireless connection or interface.

In this example, SoC 1000 includes various components such as an input-output (I/O) logic control 1002 (e.g., to include electronic circuitry) and a microprocessor 1004 (e.g., any of a microcontroller or digital signal processor). SoC 1000 also includes a memory 1006, which can be any type of RAM, SRAM, low-latency nonvolatile memory (e.g., flash memory), ROM, and/or other suitable electronic data storage. SoC 1000 can also include various firmware and/or software, such as an operating system 1008, which can be computer-executable instructions maintained by memory 1006 and executed by microprocessor 1004. SoC 1000 can also include other various communication interfaces and components, communication components, other hardware, firmware, and/or software.

SoC 1000 includes a point-to-point communication module 232 which utilizes a dynamic credit control component 234, as described above in relation to FIG. 2. The point-to-point communication module 232 and the dynamic credit control component 234 operate as described above.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, from a remote peer that is communicating using a point-to-point communication protocol, traffic class packets;
writing the traffic class packets to one traffic class buffer of multiple traffic class buffers;
receiving buffer usage data associated with usage of the multiple traffic class buffers;
statistically analyzing the buffer usage data by using one or more sliding windows to ascertain how much packet traffic occurs for individual traffic classes within a particular window; and
dynamically adjusting, based on the statistical analysis, buffer sizes while traffic class packets are being received.

2. The method of claim 1 further comprising communicating associated buffer size changes to the remote peer.

3. The method of claim 1, wherein said dynamically adjusting buffer sizes comprises increasing a buffer size for a buffer associated with heavy packet traffic.

4. The method of claim 1, wherein said dynamically adjusting buffer sizes comprises decreasing a buffer size for a buffer associated with light packet traffic.

5. The method of claim 1, wherein said dynamically adjusting buffer sizes comprises first decreasing a buffer size for a buffer associated with light traffic and then increasing a buffer size for a buffer associated with heavy packet traffic.

6. The method of claim 1, wherein said dynamically adjusting buffer sizes comprises first decreasing a buffer size, by a fixed amount, for a buffer associated with light traffic and then increasing, by the fixed amount, a buffer size for a buffer associated with heavy packet traffic.

7. The method of claim 1, wherein the point-to-point communication protocol comprises one of Peripheral Component Interconnect Express (PCIe) or MIPI UniPro.

8. The method of claim 1, wherein statistically analyzing the buffer usage data further comprises ascertaining respective maximum and minimum buffer usages for the individual traffic classes during the time window.

9. A dynamic credit control system comprising:
multiple buffers, each of which being associated with an individual traffic class and configured to store traffic class packets associated with respective traffic classes that are received from a remote peer in accordance with a point-to-point communication protocol;
a dynamic credit control component operably associated with the multiple buffers, the dynamic credit control component comprising:
a buffer statistic component configured to:
i) receive information from each buffer that corresponds to how much data is stored in the buffer; and
ii) generate, from the information, buffer usage statistics by using one or more sliding windows to ascertain how much packet traffic occurs for individual traffic classes within a particular window;

an allocation control component configured to receive the buffer usage statistics and use the buffer usage statistics to reallocate one or more of the multiple buffers and produce credit adjustments associated with reallocated buffers;

multiple traffic class receiver controllers each of which being associated with an individual traffic class, individual receiver controllers being configured to receive credit adjustments from the allocation control component and transmit credit updates associated with the credit adjustments to the remote peer.

10. The dynamic credit control system of claim 9, wherein the allocation control component is configured to reallocate the one or more multiple buffers by changing buffer sizes by a fixed amount.

11. The dynamic credit control system of claim 9, wherein the allocation control component is configured to reallocate one buffer by increasing its size by a fixed amount, and reallocate another buffer by reducing its size by the fixed amount.

12. The dynamic credit control system of claim 9, wherein the allocation control component is configured to increase the buffer size of buffers that experience heavy packet traffic and reduce the buffer size of buffers that experience light packet traffic.

13. The dynamic credit control system of claim 9, wherein the point-to-point communication protocol comprises one of Peripheral Component Interconnect Express (PCIe) or MIPI UniPro.

14. The dynamic credit control system of claim 9, wherein the point-to-point communication protocol comprises one other than Peripheral Component Interconnect Express (PCIe) or MIPI UniPro.

15. The dynamic credit control system of claim 9, wherein the buffer usage statistics generated by the buffer statistic component comprise respective maximum and minimum buffer usages for the individual traffic classes during the time window.

16. A system-on-chip comprising:
a microprocessor;
a dynamic credit control system configured to operate with the microprocessor, the dynamic credit control system comprising:

multiple buffers, each of which being associated with an individual traffic class and configured to store traffic class packets associated with respective traffic classes that are received from a remote peer in accordance with a point-to-point communication protocol;

a dynamic credit control component operably associated with the multiple buffers, the dynamic credit control component comprising:
a buffer statistic component configured to
i) receive information from each buffer that corresponds to how much data is stored in the buffer; and
generate, from the information, buffer usage statistics by using one or more sliding windows to ascertain how much packet traffic occurs for individual traffic classes within a particular window;

an allocation control component configured to receive the buffer usage statistics and use the buffer usage statistics to reallocate one or more of the multiple buffers and produce credit adjustments associated with reallocated buffers;

multiple traffic class receiver controllers each of which being associated with an individual traffic class, individual receiver controllers being configured to receive credit adjustments from the allocation control component and transmit credit updates associated with the credit adjustments to the remote peer.

17. The system-on-chip of claim 16, wherein the allocation control component is configured to reallocate the one or more multiple buffers by changing buffer sizes by a fixed amount.

18. The system-on-chip of claim 16, wherein the allocation control component is configured to reallocate one buffer by increasing its size by a fixed amount, and reallocate another buffer by reducing its size by the fixed amount.

19. A computing device embodying the system-on-chip system of claim 16.

20. The system-on-chip of claim 16, wherein the buffer usage statistics generated by the buffer statistic component comprise respective maximum and minimum buffer usages for the individual traffic classes during the time window.

* * * * *